United States Patent [19]

Smith et al.

[11] 4,013,216

[45] Mar. 22, 1977

[54] PUNCH CHECK APPARATUS

[75] Inventors: Jay A. Smith, Lansdale; James P. Linde, Lafayette Hills, both of Pa.

[73] Assignee: Sperry Rand Corporation, New York, N.Y.

[22] Filed: June 9, 1975

[21] Appl. No.: 584,802

[52] U.S. Cl. .............................................. 234/34
[51] Int. Cl.² ......................................... G06K 1/02
[58] Field of Search ................................... 234/34

[56] References Cited

UNITED STATES PATENTS

| | | | |
|---|---|---|---|
| 3,069,075 | 12/1962 | Sallach | 234/34 |
| 3,436,010 | 4/1969 | Spanjersberg | 234/34 |
| 3,448,247 | 6/1969 | Jones, Jr. | 234/34 X |
| 3,452,926 | 7/1969 | Bradley | 234/34 |
| 3,474,956 | 10/1969 | Cain | 234/34 |
| 3,795,791 | 3/1974 | Boyer | 234/34 X |

*Primary Examiner*—J. M. Meister
*Attorney, Agent, or Firm*—John B. Sowell

[57] ABSTRACT

In a card punch machine there is provided a photoelectromechanical punch checking system. A shutter is mounted on each punch pin in the card punch machine and movement of each shutter is monitored by a photoelectronic sensor. Signals from the electronic sensors are compared with data employed to select and actuate the punch pins to provide verification that the data signals have caused the selected punch pins to be actuated through a punching operation cycle.

3 Claims, 3 Drawing Figures

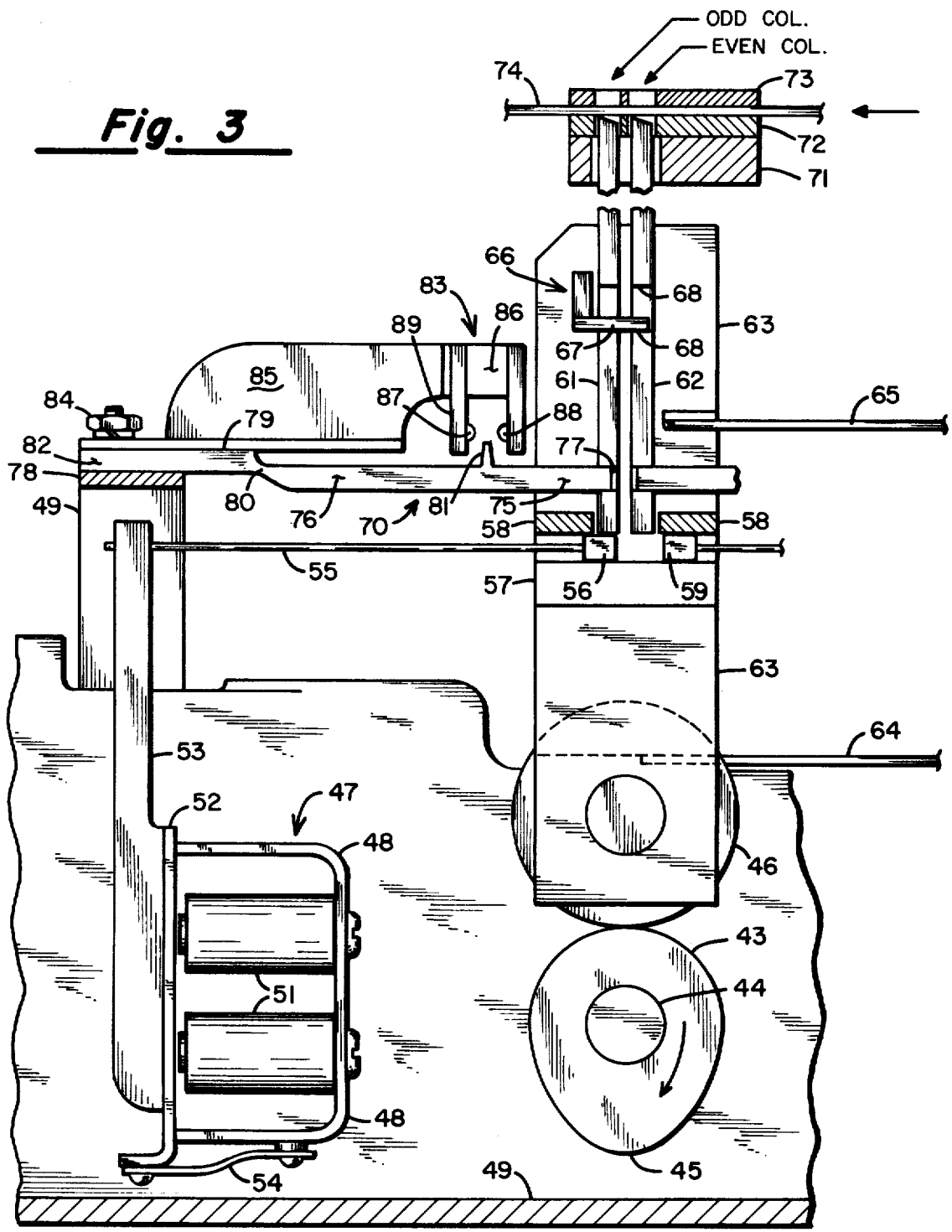

PUNCH CHECK APPARATUS

BACKGROUND OF THE INVENTION

1. Field of the Invention

The present invention relates to machines and apparatus for punching tab cards or punch cards, and more particularly to a photoelectromechanical subsystem for verifying that data signals employed to initiate punches in a tab card have caused the punch pins to punch the tab cards or punch cards in the selected positions.

2. Description of the Prior Art

Verification of data punched into a punch card has long been a standard procedure employed with prior art punch card machines and data entry systems. Several different methods of verifying punch cards have become fairly standard in the punch card art.

The most accurate type of verification of punch card data is obtained when the original source data is employed by the same or a different operator to initiate the same set of signals employed to prepare the original punch card. The second set of data entry signals are stored in a buffer storage register and then compared with the data read from the previously punched card. This type of verification requires at least twice the amount of time of an operator because all entries to be entered into a punch card are manually entered at least twice. When an error occurs, the manual entry may be repeated as many as four times to achieve a proper verification. This type of double entry verification also requires substantial special equipment in the form of registers, a pre-punch reading station and electronic logic. Systems of the double entry verification type have been incoporated into separate pieces of equipment to perform the verification process alone but may be incorporated into the more expensive card punch machines.

Some types of verification systems do not require double entry of data. The original data to be punched into a punch card may be entered into a buffer register. The data entered into the buffer register may be punched into the punch card and the card then read at a post reading station so that the data read from the card may be compared with the original data stored in the buffer register. A system of this type requires special equipment in the form of a post punch reading station, registers and electronic logic. The post punch reading station may be simplified to some extent by having the logic read the punch perforations and perform a parity type check rather than a complete comparison of the data entered.

Another type of verification system which does not require double entry of data senses the movement of the punch pin rather than performing a post punch reading operation. The original data to be entered into the punch card is stored in a buffer register and then compared with data signals generated by sensing the movement of the punch pins. Heretofore, such systems have employed mechanical switches and/or inductive sensing heads. Mechanical switches have been found to be subject to numerous malfunctions of various types and require substantial maintenance. Inductive sensing heads are more reliable than mechanical switches but are expensive and often difficult to install and service.

There are a very large number of existing card punch machines which do not have verification systems of any type. None of the aforementioned prior art verification systems are simple enough or compact enough to be incorporated into the existing card machines or designs of the prior art machine or designs of the prior art type punching stations without substantial modification or rebuilding. None of the aforementioned prior art verification systems permit a simple retrofit into existing keypunch equipment which does not have a verification system.

SUMMARY OF THE INVENTION

The present invention provides a simple, reliable and economic subsystem which verifies whether the data signals employed to punch data into a punch card have been properly entered into the punch card.

It is the general object of the present invention to provide a novel electronic sensing system for determining whether the punch pins of the punch card machine have been moved through a punching operation cycle.

It is another general object of the present invention to provide a punch card verification system which determines whether the data signals employed to set or move the punch pins have caused the punch pins to be moved through a punching operation cycle.

It is a more specific object of the present invention to provide a small compact sensing system for a punch card verification system of the type which may be adapted or retrofitted to most existing punch card machines without verification systems to monitor the movement of the punch pins.

It is a further object of the present invention to provide a punch card verification system for punch card machines which does not require substantial modification of the existing mechanical designs.

These and other objects of the present invention are achieved by storing in a buffer register, the data signals to be employed to set or select the punch pins to be moved during a punching operation cycle. An electronic sensor is provided adjacent to each of the punch pins to be moved. A shutter mechanism is mounted on and moved by each of the punch pins to be actuated. The sensor senses movement of the shutter which indicates movement of the punch pin. Gating logic an timing control means compare the data stored in the buffer register with the position of the punch pins when the punch card machine is in the punching position to provide verification of the correct entry of the data stored in the buffer register.

BRIEF DESCRIPTION OF THE DRAWINGS

FIG. 3 is a partial section in elevation showing the cam driven punch pins and associated electrical sensor means and the punch pin selection actuators.

DESCRIPTION OF THE PREFERRED EMBODIMENTS

Information to be punched into a punch card may be derived from a keyboard actuated by a manual operator, from another card being read at a reading station, from optical or magnetic scanning devices or from data stored in various forms of memory storage devices. The majority of errors introduced in keypunching operations are introduced by an operator misinterpreting the source data. Other than operator introduced errors of the human type, the majority of punch card errors occur at the punching station due to some malfunction of the electromechanical punching machinery. Modern data entry systems are depending less and less on the portion of the data which is manually introduced; thus, verification of the punching operation is often a highly accurate method of card verification.

Figure 1:
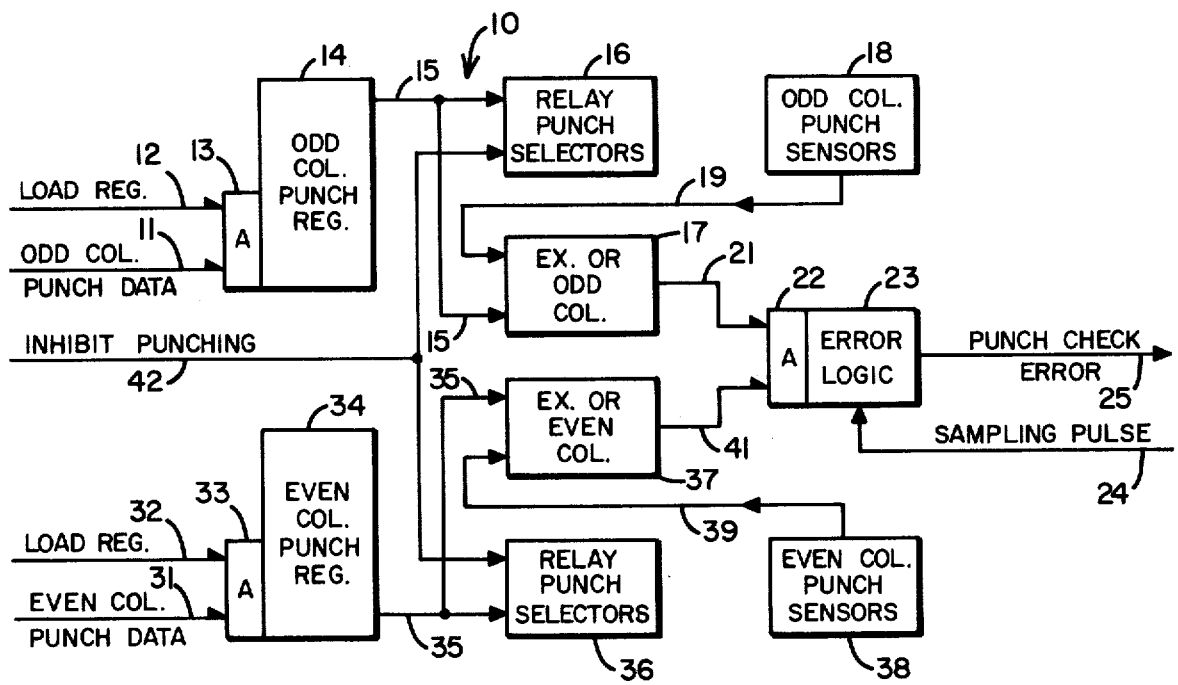
FIG. 1 is a schematic block diagram of the electrical circuitry for the card punch verification subsytem.

The punch card verification subsystem 10 shown in FIG. 1 is adapted to accept data from various sources of information and to cause the information to be punched into a punch card on two columns simultaneously, hereinafter called an odd column and an even column. The odd column punched data line 11 preferably comprises twelve or more parallel lines representative of a column of data for a standard punch card format. Data on line 11 is enabled by a load register signal on line 12 at AND gate 13 which causes all the stages of odd column buffer register 14 to be set with information representative of one column of data for a standard punch card. Data set in odd column buffer register 14 is continuously available to produce signals on parallel register output lines 15. The high or active signal output causes relay punch pin selection means 16 to be actuated. As will be explained hereinafter, the relay punch pin selection means 16 comprise a plurality of mechanical solenoids and actuators. Selection of a solenoid will cause the selected punch pin to be mechanically moved. The signals from register output line 15 are applied as high and low inputs to a plurality of exclusive OR gates 17. One exclusive OR gate 17 is provided for each output line 15. When the output signal for row 1 on line 15 is low, the associated relay punch pin solenoid 16 for row 1 of the odd column is not actuated and the associated odd column punch pin sensor 18 for row 1 of the odd column is not actuated because the odd column row 1 punch pin was not mechanically moved to cause the sensor output line 19 for row 1 to go low. The sensor output line 19 for row 1 of the odd column punch pin sensors 18 and the register output line 15 for row 1 are connected to the same exclusive OR gate 17. The sensor output lines 19 and the register output lines 15 for the same rows of the odd columns are connected to the same exclusive OR gate 17 so that matched low and high comparisons from the plurality of exclusive OR gates 17 create a plurality of high signal pulses on exclusive OR gate output lines 21. When all of the output lines 21 representative of all the rows of the odd column are high, the data signals indicative of the punch pins to be selected have caused the selected punch pins to be actuated and their associated sensors to create an output. The punch pins which were not selected have not been actuated and their associated sensors have not created an output, but have remained low. The output of sensors (sensor means) 18 is inverted before being applied to sensor output lines 19 to simplify the circuit logic.

A high output on line 15 which correctly causes its associated punch pins to be actuated, creates a low output on line 19 and when compared at exclusive OR gate 17 creates a high output on one of the lines 21. The high outputs indicative of a verified proper punch operation on line 21 are all applied to AND gate 22 to produce a high output therefrom. When the error logic 23 senses that all inputs to AND gate 22 are present, a high output is generated and the error logic 23 is set to verify that a correct punching operation cycle has occurred. A sampling pulse on line 24 is applied when the punch pin driving cam is at or near its highest lift point to assure actuation of the sensors. When there is no output on punch check error line 25, there is verification that the correct punching operation cycle has occurred. It will be understood that the electrical logic can be reversed and that a positive pulse can be produced on punch check error line 25 to indicate that verification of the punching operation cycle has occurred.

In the preferred embodiment shown in FIG. 1, provision is made for simultaneously punching and verifying two columns of information referred to herein as an odd column and an even column. The even column logic is effectively a duplication of the previously described odd column logic 11 to 21 and the even and odd column logics share elements 23 to 25. Information to be punched into the even column of a punch card is provided on even column punch data line 31. The load register signal on line 32 is applied to AND gate 33 to enable the setting of even column buffer register 34. The output of even column buffer register 34 on lines 35 are applied to relay punch pin selector means 36 and exclusive OR gates 37. Movement of the even column punch pins is sensed by even column pin sensors 38 and the output signals therefrom on line 39 are applied to even column exclusive OR gates 37. The output from the even column exclusive OR gates 37 is presented on lines 41 to AND gate 22 to cause the error logic 23 to be set. The sampling pulse on line 24 will read out any error on punch check error line 25. It will be understood that the error signal on line 25 indicates that an error is present in either the odd or the even column. The error signal on line 25 may be separated by duplicating the AND gate 22 and part or all of the error logic 23. This will require two punch check error lines 25.

Figure 2:
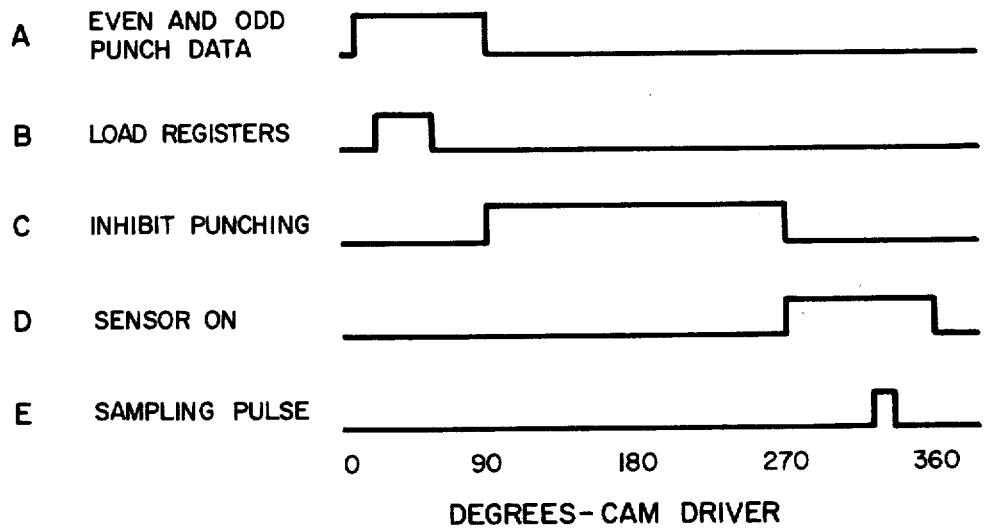
FIG.2 is a timing diagram showing pulses employed in the electrical circuitry of FIG. 1.

Refer now to FIG. 2 showing a timing diagram having an abscissa or horizontal coordinate calibrated in degrees of rotation of the driving cam. The 0° and 360° points are representative of the points of highest lift of the punch pin driving cam. At approximately 0° and 360° the punch pins are completely extended through the punch die plate and the card to be punched. A relatively high lift cam lobe on the drive cam is employed over less than 180° and the remainder of the cam is of uniform height representing an idle condition. The high portion of the cam occurs slightly before 360° and is still high at 0°.

Waveform 2A of FIG. 2 shows the timing for the data to be entered into a punch card which is presented on lines 11 and 31 of FIG. 1 during the first quarter of the cam cycle. Waveform 2B shows the load register signal which is applied on lines 12 and 32 and is presented approximately midway during the presentation of the information to the registers 14 and 34 as shown in waveform 2A. Once registers 14 and 34 are set or loaded with the source information, the low active inhibit punching signal shown in waveform 2C, and presented on line 42 of FIG. 1, may be allowed to go high. This low active inhibit signal is applied to the relay punch pin selection means 16 and 36 so the actuators will not be attempting to move while the punch pins are being driven by the drive cam as will be explained hereinafter. The high portion of waveform 2C is representative of the time in which the actuators are free to be energized and moved mechanically.

The high portion of waveform 2D represents the approximate time during which sensor means 18 and 38 are active to sense movement of the punch pins. The activation of the sensor means 18 and 38 occur about the time the low active inhibit punch signal shown on waveform 2C on line 42 becomes active.

When the sensor means 18 and 38 are fully active and near the highest lift point on the drive cam, the sampling pulse shown in waveform 2E is generated to read any error which may have been detected and set at error logic 23.

Refer now to FIG. 3 showing a preferred arrangement of the electromechanical elements of the card punch verification subsystem. Driving cam 43 is fixed on drive shaft 44 and has its lobe 45 at approximately 0° or 360° of the cam 43 timing chart of FIG. 2. Accordingly, the roller 46 as shown is at approximately 180° of the cam timing diagram and the inhibit signal 2C is high and permissive. The solenoid 47 comprises one of the aforementioned selection devices or relay punch selectors 16 and 36. Elongated non-magnetic channel 48 is mounted on the frame 49 and adapted to support and house a plurality of coils 51. The coils 51 shown when energized attract a magnetic actuator plate 52 of actuator arm 53 toward the coils 51. The solenoid actuator 47 is shown in the actuated position. When the coils 51 are not energized, pivot support spring 54 will urge actuator arm 53 outward away from channel 48. The free end of actuator arm 53 is connected to a flexible round wire 55 which extends horizontally and is terminated in a connection to a rectangular slug 56. Slug 56 is free to move horizontally on striker plate 57 and is guided by guideplate 58. During the 90° to 270° timing portion of the drive cycle, slugs 56 and 59 are free to be moved under the bottom of punch pins 61 and 62. When registers 14 and 34 are loaded, the information therein will energize selective solenoids like the solenoid 47 which are provided for each pin. There are at least twelve punch pins for each column in a standard punch card format; thus, there are at least twelve solenoids like solenoid 47 for the odd column punch pins 61 and an additional twelve solenoids for the even column punch pins 62. Solenoid 47 is shown in the energized position wherein punch pin 61 is selected to be moved when drive cam 43 presents lobe 45 to roller 46. Slug 59 is shown in the non-energize position wherein punch pin 62 is not selected to be moved by drive cam 43.

Cam 43, when moved through a punch operation cycle, will cause follower housing 63 to be moved linearly. Flexure springs 64, 65 support follower housing 63 and compression spring (not shown) urge the roller follower 46 against cam 43. Stripper-keeper 66 is mounted on housing 63 and provided with comb-shaped plate 67 having fingers which enter into notches 68 in the punch pins 61, 62. Punch pin 61, 62 are free to move through a punching operation cycle when selected by actuator solenoids 47 and slugs 56, 59. Punch pin 61, 62 are stripped or returned from the punching position by the stripper-keeper 66.

Upper guide plate 71 is mounted on frame 49 and is provided with rectangular slots to receive and guide retangular punch pin 61, 62 which may be slightly beveled at their cutting ends to enhance the punching operation. Since cam 43 is at the idle or lower portion of its cycle, roller follower 46 is at its lowest portion of its cycle and the cutting ends of punch pin 61, 62 are recessed in punch plate 72. Spaced apart from punch plate 72 and mounted on frame 49 is punch die plate 73 which is provided with retangular punch holes adapted to receive the cutting ends of punch pin 61, 62. The punch chaff may be disposed of by gravity when the punch card 74 is fed through in an upright position or may be removed by vacuum means when fed through in other positions. Details of the punch card feed mechanism are well known and need not be shown here in detail.

Movement of punch pin 61 by cam 43 will cause shutter device 70 which is mounted thereon to be moved therewith. When punch pin 61 is moved through a punching operation cycle, the movable end 75 of lever 76 which is engaged in slot 77 of pin 61 is also moved therewith. The fixed end 79 of lever 76 is mounted on plate 78 of frame 49. Shutter device 70 comprising lever 76 is preferably made of an opaque flexible plastic and provided with a shutter 81 intermediate its ends. The fixed end 79 of lever 76 comprises a continuous strip of plastic 82 having a plurality of levers or fingers 76 extending therefrom and each finger is provided with a constriction 80 to enhance flexing of the cantilever beam fingers near the fixed base 82.

Sensor means 83 is also mounted on plate 78 and held in place by removable nut 84. Mounting bracket 85 supports sensor assembly means 86 juxtaposed the shutter 81. It will be understood that a shutter 81 is provided on each of the plurality of levers 76 and adapted to be moved between a light sending station 87 and a light receiving station 88 which is associated with each of the punch pins like pin 61, 62. When punch pin 61 is moved through a punching operation cycle, lever 76 causes shutter 81 to cut off the light receiving station 88. In the preferred embodiment shown, a light emitting diode 87 was employed as a light sending station or light source and a photo sensitive transistor was employed as a light receiving station 88. The output of the photo sensitive transistor 88 was connected to the collector, and when the shutter 81 cuts off the light to the base of the transistor 88, the collector voltage increased. This output signal was inverted to provide punch pin data signals which were applied to the exclusive OR gates 17, 37 to provide a high output punch pin data signal therefrom when the sensor assembly means 83 confirm that a selected punch pin has been actuated in response to the data signals stored in the buffer register 14.

Light emitting diodes 87 and photo sensitive transistors 88 are very small, extremely reliable and long lasting. Diodes 87 and transistors 88 were encapsulated in the channel shaped elongated plastic sensing head 89 and were provided with printed circuit board lead-out plates attached thereto (not shown).

An existing card punch station may be retrofitted with a verification subsystem sensing means 83 and shutter means 81 as described hereinbefore. In the event that the punch pins 61, 62 are not provided with all of the proper notches and slots to receive the levers 76, the punch pin 61, 62 may be replaced or modified in the field. The electronic logic circuitry may be mounted at any convenient place within the punch station housing of the data entry system. A timing cam of the printed circuit type or the photoelectric cell type (not shown) is preferably mounted in the punch station to provide the timing signals shown and described with regard to FIG. 2.

Having explained a preferred embodiment, it will be understood that the card punch verification subsystem may be retrofitted to existing card punching machines or may be added to new machines or new designs without the necessity of modifying the existing mechanisms.

We claim:

1. A punch card subsystem for a card punch comprising:
   a register for receiving and storing a plurality of signals indicative of data to be punched into a card,
   a plurality of punch pins for punching said data into said card,
   a plurality of punch pin selection actuators responsive to said data stored in said register for selecting individual punch pins to be moved,
   punch pin driving means for moving said punch pins selected by said punch pin selection actuators,
   a shutter device associated with and movable by each said punch pin,
   said shutter device comprising a flexible cantilever having a fixed end mounted on a frame, a movable end connected to said punch pin and a shutter intermediate the ends of said lever,
   a sensing device associated with each said punch pin and each said shutter device for generating punch pin data signals indicative of punching movement of said punch pins, and
   error checking means for comparing said data stored in said register and said punch pin data signals for verifying correct card punch entries.

2. A punch card subsystem as set forth in claim 1 wherein said shutter device comprises a plurality of plastic molded levers extending from a common molded base, each said shutter on each said lever being pivotally mounted to interpose between a light sending station and a light receiving station of said sensing device when each said punch pin is moved.

3. In a punch card subsystem of the type having a plurality of punch pins selectively actuated by data signals from a data source, an error checking logic system comprising the improvement:
   a buffer register for storing data signals indicative of data to be entered into a punch card,
   means for selecting individual punch pins to be moved through a punching operation in response to said data signals,
   means for moving said selected punch pins through a punching operation cycle
   shutter means on each said punch pin,
   sensor means associated with said shutter means providing a plurality of punch pin data signals representative of the individual punch pins being moved through a punching operation, and
   error checking means for comparing said stored data signals with said punch pin data signals and providing an output indicating whether the data to be entered in said punch card has caused said punch pins to be moved through a punching operation cycle,
   said error checking means comprising a plurality of exclusive OR gates for receiving and comparing said punch pin data signals with said data signals, and
   an AND gate for comparing the outputs of said exclusive OR gates to provide an error signal.

* * * * *